US012444559B2

(12) United States Patent
Invernizzi et al.

(10) Patent No.: US 12,444,559 B2
(45) Date of Patent: Oct. 14, 2025

(54) MEDIUM VOLTAGE SWITCHING APPARATUS

(71) Applicants: ABB Schweiz AG, Baden (CH); ABB S.p.A., Milan (IT)

(72) Inventors: Pierluigi Invernizzi, Corna Imagna (IT); Pierino Bertolotto, Bergamo (IT)

(73) Assignees: ABB Schweiz AG, Baden (CH); ABB S.p.A., Milan (IT)

( * ) Notice: Subject to any disclaimer, the term of this patent is extended or adjusted under 35 U.S.C. 154(b) by 121 days.

(21) Appl. No.: 18/312,727

(22) Filed: May 5, 2023

(65) Prior Publication Data

US 2023/0368995 A1 Nov. 16, 2023

(30) Foreign Application Priority Data

May 12, 2022 (EP) .................................... 22173032

(51) Int. Cl.

*H01H 33/12* (2006.01)
*H01H 33/664* (2006.01)
*H01H 33/666* (2006.01)

(52) U.S. Cl.

CPC ...... *H01H 33/6661* (2013.01); *H01H 33/121* (2013.01); *H01H 33/664* (2013.01); *H01H 33/6664* (2013.01)

(58) Field of Classification Search

CPC ............ H01H 33/6661; H01H 33/664; H01H 33/6664; H01H 33/6606; H01H 33/666;

(Continued)

(56) References Cited

U.S. PATENT DOCUMENTS

| | | | | |
|---|---|---|---|---|
| 5,821,486 | A | 10/1998 | Paw | |
| 7,091,439 | B2 * | 8/2006 | Vaghini ............... | H01H 33/125 218/7 |

(Continued)

FOREIGN PATENT DOCUMENTS

| | | | |
|---|---|---|---|
| DE | 3811368 | A1 | 11/1988 |
| DE | 102007042041 | B3 | 2/2009 |

(Continued)

OTHER PUBLICATIONS

Extended European Search Report for European Application No. 22173032.8 dated Nov. 14, 2022, 13 pages.

(Continued)

*Primary Examiner* — William A Bolton
(74) *Attorney, Agent, or Firm* — McCarter & English, LLP; Michael M. Gnibus

(57) ABSTRACT

A switching apparatus including one or more electric poles. For each electric pole, the switching apparatus includes a first pole terminal, a second pole terminal, a ground terminal, and a plurality of fixed contacts spaced apart one from another. For each electric pole, the switching apparatus further includes a movable contact and a vacuum interrupter. The vacuum interrupter includes a fixed arc contact and a movable arc contact reversibly movable along a corresponding translation axis between a coupled position with the fixed arc contact and an uncoupled position from the fixed arc contact. For each electric pole, the switching apparatus further includes a motion transmission mechanism operatively coupled to a contact shaft coupled to the movable arc contact. The motion transmission mechanism is actuatable by the movable contact to cause a movement of said movable arc contact along said translation axis, when said movable contact moves about said rotation axis.

14 Claims, 8 Drawing Sheets

(58) Field of Classification Search
CPC . H01H 2033/566; H01H 31/003; H01H 31/16
USPC ......................... 218/118, 120, 123, 126, 140
See application file for complete search history.

(56) References Cited

U.S. PATENT DOCUMENTS

| | | | | |
|---|---|---|---|---|
| 8,581,135 B2 * | 11/2013 | Piccoz | H01H 33/126 218/120 |
| 9,058,948 B2 * | 6/2015 | Grosjean | H01H 33/126 |
| 9,679,724 B2 * | 6/2017 | Abrahamsen | H01H 33/128 |
| 2002/0066655 A1 * | 6/2002 | Theaudiere | H01H 9/104 200/47 |
| 2023/0230785 A1 * | 7/2023 | Hyrenbach | H01H 33/143 218/118 |

FOREIGN PATENT DOCUMENTS

| | | | |
|---|---|---|---|
| DE | 202010009448 | U1 | 9/2010 |
| EP | 0154004 | A1 | 9/1985 |
| EP | 0517295 | A2 | 12/1992 |
| EP | 0680063 | A1 | 11/1995 |
| EP | 0693763 | B1 | 4/2000 |
| EP | 1226596 | B1 | 1/2003 |
| EP | 1928065 | A1 | 6/2008 |
| EP | 1939910 | A1 | 7/2008 |
| EP | 2312603 | A1 | 4/2011 |
| EP | 2645378 | A1 | 10/2013 |
| FR | 1367073 | A | 7/1964 |
| IT | 249699 | Y1 | 5/2003 |
| JP | 09097543 | A | 4/1997 |
| WO | 2005106910 | A1 | 11/2005 |
| WO | 2014001029 | A1 | 1/2014 |

OTHER PUBLICATIONS

International Search Report for International Application No. PCT/EP2013/061437, dated Aug. 8, 2013, 4 pages.

European Search Report for European Application No. EP09460044 dated Jan. 18, 2010, 3 pages.

European Search Report for European Application No. EP12161172 dated Aug. 29, 2012, 3 pages.

* cited by examiner

MEDIUM VOLTAGE SWITCHING APPARATUS

CROSS-REFERENCE TO RELATED APPLICATION

This application claims priority to European Patent Application No. 22173032.8, filed May 12, 2022, and titled "A MEDIUM VOLTAGE SWITCHING APPARATUS", which is hereby incorporated by reference in its entirety.

BACKGROUND

The present disclosure relates to a switching apparatus for medium voltage ("MV") electric systems, more particularly to a load-break switch for medium voltage electric systems.

Load-break switches are well known in the state of the art.

These switching apparatuses, which are generally used in secondary distribution electric grids, are capable of providing circuit-breaking functionalities (namely breaking and making a current) under specified circuit conditions (typically nominal or overload conditions) as well as providing circuit-disconnecting functionalities (namely grounding a load-side section of an electric circuit).

Most traditional load-break switches of the state of the art have their electric poles immersed in a sulphur hexafluoride ($SF_6$) atmosphere as this insulating gas ensures excellent performances in terms of dielectric insulation between the live parts and arc-quenching capabilities when currents are interrupted.

As is known, however, $SF_6$ is a powerful greenhouse gas, and its usage is subject to severe restriction measurements for environmental preservation purposes. For this reason, over the years, there has been made a considerable effort to develop and design load-break switches not employing $SF_6$ as an insulating gas.

Some load-break switches have been developed, in which electric poles are immersed in pressurized dry air or other environment-friendly insulation gases, such as mixtures of oxygen, nitrogen, carbon dioxide and/or fluorinated gases. Unfortunately, the experience has shown that these switching apparatuses generally do not show fully satisfactory performances, particularly in terms of arc-quenching capabilities.

Other currently available load-break switches employ, for each electric pole, different contact arrangements electrically connected in parallel between the pole terminals.

A contact arrangement has electric contacts operating in an atmosphere filled with an environment-friendly insulating gas or air and it is designed for carrying most of the current flowing along the electric pole as well as driving possible switching maneuvers.

Another contact arrangement, instead, has electric contacts operating in a vacuum atmosphere and it is specifically designed for quenching the electric arcs arising when the current flowing along the electric pole is interrupted.

These switching apparatuses have proven to ensure a relatively low environmental impact while providing, at the same time, high-level performances in terms of dielectric insulation and arc-quenching capabilities. However, until now, they still offer poor performances in terms of structural compactness.

BRIEF DESCRIPTION

The present disclosure provides a switching apparatus for MV electric systems that allows solving or mitigating the above-mentioned technical problems.

More particularly, the present disclosure provides a switching apparatus ensuring high-level performances in terms of dielectric insulation and arc-quenching capabilities during the current breaking process and, at the same time, having electric poles with high compactness and structural simplicity.

The present disclosure also provides a switching apparatus that can be easily manufactured at industrial level, at competitive costs with respect to the solutions of the state of the art.

The present disclosure provides a switching apparatus, according to the following claim 1 and the related dependent claims.

In a general definition, the switching apparatus of the present disclosure includes one or more electric poles.

For each electric pole, the switching apparatus includes a first pole terminal, a second pole terminal and a ground terminal. In operation, the first pole terminal can be electrically coupled to a first conductor of an electric line, the second pole terminal can be electrically coupled to a second conductor of said electric line and the ground terminal can be electrically coupled to a grounding conductor.

For each electric pole, the switching apparatus includes a plurality of fixed contacts spaced apart one from another around the main longitudinal axis of the switching apparatus. Such a plurality of fixed contacts includes a first fixed contact electrically connected to the first pole terminal, a second fixed contact electrically connected to the second pole terminal, a third fixed contact electrically connected to the ground terminal and a fourth fixed contact, which, in operation, is electrically connectable with the second fixed contact.

For each electric pole, the switching apparatus further includes a movable contact, which is reversibly movable about a corresponding rotation axis according to opposite first and second rotation directions, so that said movable contact can be coupled to or uncoupled from one or more of the above-mentioned fixed contacts.

In particular:

- said movable contact is coupled to a first fixed contact region of said first fixed contact and to a second fixed contact region of said second fixed contact, thereby electrically connecting said first and second fixed contacts, when said switching apparatus is in a closed state;
- said movable contact is coupled to no fixed contacts, thereby being electrically disconnected from said fixed contacts, when said switching apparatus is in an open state; and
- said movable contact is coupled to a third fixed contact region of said second fixed contact and to a fourth fixed contact region of said third fixed contact, thereby electrically connecting said second and third fixed contacts, when said switching apparatus is in a grounded state.

For each electric pole, the switching apparatus further includes a vacuum interrupter, which includes a fixed arc contact electrically connected to the first pole terminal and a movable arc contact electrically connected to the fourth fixed contact and reversibly movable along a corresponding translation axis between a coupled position with the fixed arc contact and an uncoupled position from the fixed arc contact. The vacuum interrupter further includes a vacuum chamber, in which the fixed arc contact and the movable arc contact are enclosed and are coupled or decoupled.

For each electric pole, the switching apparatus further includes a motion transmission mechanism operatively coupled to the movable arc contact. Such a motion transmission mechanism is actuatable by the movable contact to cause a movement of the movable arc contact along said translation axis, when said movable contact moves about said rotation axis.

In the switching apparatus according to the present disclosure, for each electric pole, the above-mentioned first and second pole terminals are aligned along a first alignment direction.

The above-mentioned first and second fixed contact regions of the first and second fixed contacts are instead arranged at opposite sides relative to the rotation axis of said movable contact and are displaced relative to the first alignment direction of said first and second pole terminals, so that they are aligned along a second alignment direction angularly spaced from the first alignment direction of the first and second pole terminals.

In the switching apparatus of the present disclosure, for each electric pole, the above-mentioned first and fourth fixed contact regions of the first and third fixed contacts and the above-mentioned second and third fixed contact regions of the second fixed contact may be arranged on opposite sides of said switching apparatus relative to the first alignment direction of the above-mentioned first and second pole terminals.

In the switching apparatus according to the present disclosure, for each electric pole, said vacuum interrupter may be arranged in proximity of said first pole terminal and may be oriented so that the translation axis of said movable arc contact is parallel to or coinciding with the first alignment direction of said first and second pole terminals.

The above-mentioned first pole terminal, first fixed contact and vacuum interrupter may be at least partially accommodated in a portion of internal volume defined by a bushing of an insulating housing of said switching apparatus.

Further characteristics and advantages of the present disclosure will emerge from the description of embodiments of the switching apparatus, according to the present disclosure, non-limiting examples of which are provided in the attached drawings.

DETAILED DESCRIPTION

Figure 1:
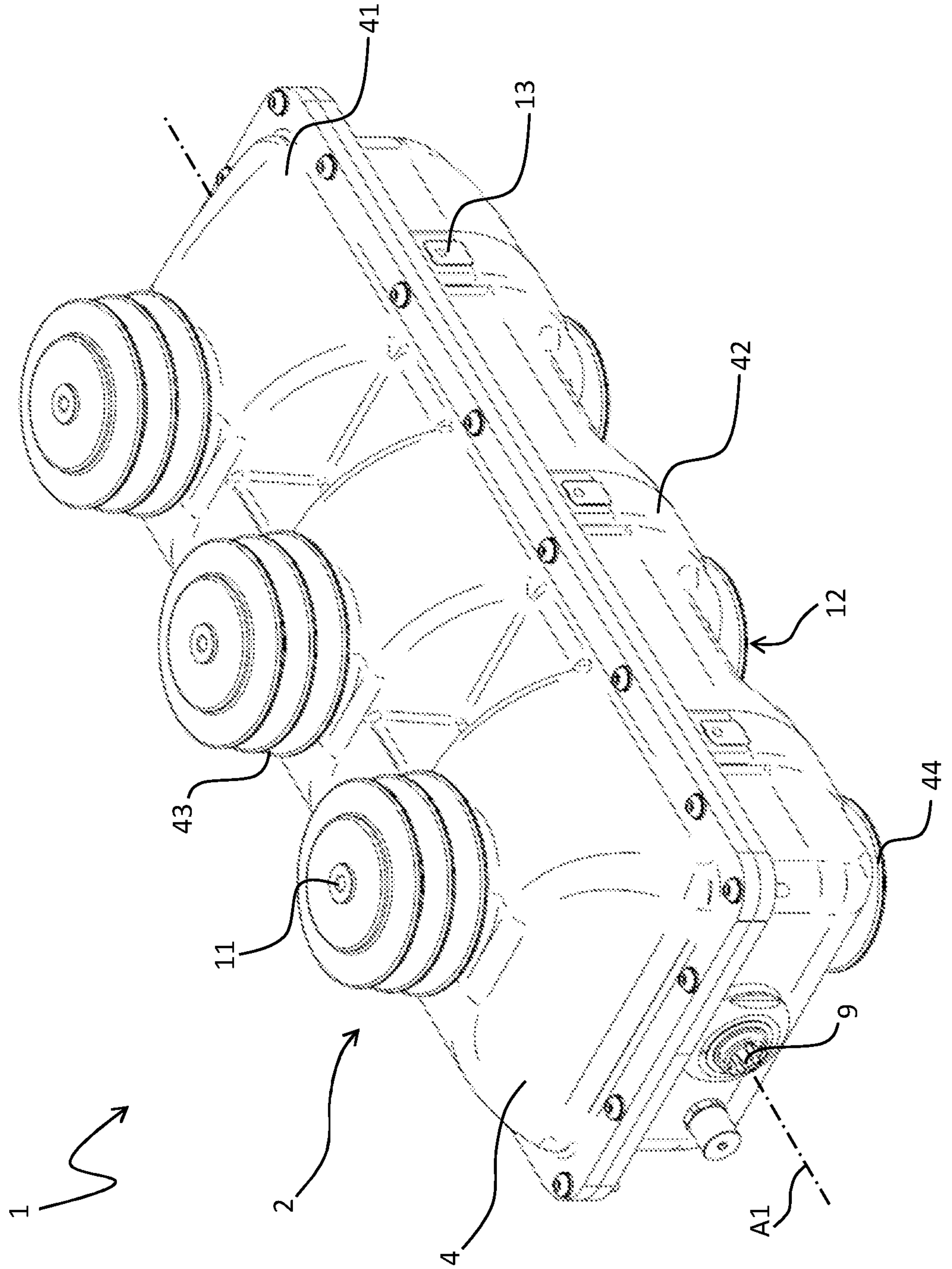
FIG. 1 is a schematic outer view of the switching apparatus, according to the present disclosure.

With reference to the figures, the present disclosure relates to a switching apparatus 1 for medium voltage electric systems.

For the purposes of the present disclosure, the term “medium voltage” (MV) relates to operating voltages at electric power distribution level, which are higher than 1 kV AC and 1.5 kV DC up to some tens of kV, e.g., up to 72 kV AC and 100 kV DC.

For the purposes of the present disclosure, the terms “terminal” and “contact” should be hereinafter intended, unless otherwise specified, as “electric terminal” and “electric contact”, respectively, thereby referring to electrical components suitably arranged to be electrically connected or coupled to other electrical conductors.

The switching apparatus 1 is particularly adapted to operate as a load-break switch. It is therefore designed for providing circuit-breaking functionalities under specified circuit conditions (nominal or overload conditions) as well as circuit-disconnecting functionalities, in particular grounding a load-side section of an electric circuit.

The switching apparatus 1 includes one or more electric poles 2.

The switching apparatus 1 may be of the multi-phase (e.g., three-phase) type and it may include a plurality (e.g., three) of electric poles 2.

According to embodiments of the present disclosure (shown in the cited figures), the switching apparatus 1 is a self-standing product.

In this case, the switching apparatus may include an insulating housing 4, which conveniently defines an internal volume where the electric poles 2 are accommodated.

The insulating housing 4 may have an elongated shape (e.g., substantially cylindrical) developing along a main longitudinal axis of the switching apparatus. The electric poles 2 may be arranged side by side along corresponding transversal planes perpendicular to the main longitudinal axis of the switching apparatus.

The insulating housing 4 may be formed by an upper shell 41 and a lower shell 42 that are mutually joined along suitable coupling edges.

From each electric pole, the insulating housing 4 may include a first bushing 43 protruding from a top region of the upper shell 41 and a second bushing 44 protruding from a bottom region of the second shell 42 (reference is made to a normal operating positioning of the switching apparatus like that one shown in FIG. 1).

In the following, the switching apparatus of the present disclosure will be described with reference to these embodiments for the sake of brevity only and without intending to limit the scope of the present disclosure. In fact, according to other embodiments of the present disclosure (not shown), the switching apparatus might be installed in a cubicle together with other electric devices. In this case, the switching apparatus may not include a dedicated housing as shown in the cited figures.

The internal volume of the switching apparatus 1 may be filled with pressurized dry air or another insulating gas having a low environmental impact, such as a mixture of oxygen, nitrogen, carbon dioxide and/or a fluorinated gas.

For each electric pole 2, the switching apparatus 1 includes a first pole terminal 11, a second pole terminal 12 and a ground terminal 13.

The first pole terminal 11 is adapted to be electrically coupled to a first conductor of an electric line (e.g., a phase conductor electrically connected to an equivalent electric power source), the second pole terminal 12 is adapted to be electrically connected to a second conductor of an electric line (e.g., a phase conductor electrically connected to an equivalent electric load) while the ground pole terminal 13 is adapted to be electrically connected to a grounding conductor.

In the embodiments shown in the cited figures, the first pole terminal may be accommodated, at least partially, in a portion of internal volume defined by the first bushing 43 while the second pole terminal 12 is at least partially accommodated in a portion of internal volume defined by the second bushing 44.

For each electric pole 2, the switching apparatus 1 includes a plurality of fixed contacts, which are spaced apart one from another around a main longitudinal axis of the switching apparatus.

For each electric pole, the switching apparatus 1 includes a first fixed contact 5, a second fixed contact 6, a third fixed contact 7 and a fourth fixed contact 8.

The first fixed contact 5 is electrically connected to the first pole terminal 11, the second fixed contact 6 is electrically connected to the second pole terminal 12, the third fixed contact 7 is electrically connected to the ground pole terminal 13 while the fourth fixed contact 8 is electrically connected to a vacuum interrupter of the switching apparatus as better explained in the following. In some operating conditions of the switching apparatus, the fourth fixed contact 8 can be electrically connected with the second fixed contact 6.

The switching apparatus 1 includes, for each electric pole 2, a movable contact 10 reversibly movable (along a given plane of rotation) about a corresponding rotation axis A1, which may coincide with the main longitudinal axis of the switching apparatus.

The movable contact 10 can rotate according to a first rotation direction R1, which is conveniently oriented away from the first fixed contact 5, or according to a second rotation direction R2, which is opposite to the first rotation direction R1 and is oriented towards the first fixed contact 5. With reference to the observation plane of FIGS. 2-8, the above-mentioned first rotation direction R1 is oriented counter-clockwise while the above-mentioned second rotation direction R2 is oriented clockwise.

In operation, the switching apparatus 1 is capable of switching in three different operating states, namely:

- a closed state, in which each electric pole 2 has the first and second pole terminals 11, 12 electrically connected one to another and both electrically disconnected from the ground terminal 13. When the switching apparatus is in a closed state, a current can flow along each electric pole 2 between the corresponding first and second pole terminals 11, 12;
- an open state, in which each electric pole 2 has the first and second pole terminals 11, 12 and the ground terminal 13 electrically disconnected one from another. When the switching apparatus is in an open state, no currents can flow along the electric poles 2; and
- a grounded state, in which each electric pole 2 has the first and second pole terminals 11, 12 electrically disconnected one from another and the second pole terminal 12 and the ground terminal 13 electrically connected one to another. When the switching apparatus is in a grounded state, no currents can flow along the electric poles 2. However, the second pole terminal 12 of each electric pole (and therefore the second line conductor connected thereto) is put at a ground voltage.

In operation, the switching apparatus 1 is capable of carrying out different types of maneuvers, each corresponding to a transition among the above-mentioned operating states. In particular, the switching apparatus is capable of carrying out:

- an opening maneuver when it switches from a closed state to an open state;
- a closing maneuver when it switches from an open state to a closed state;
- a disconnecting maneuver when it switches from an open state to a grounded state; and
- a reconnecting maneuver when it switches from a grounded state to an open state.

The switching apparatus can switch from a closed state to a grounded state by carrying out an opening maneuver and subsequently a disconnecting maneuver while the switching apparatus can switch from a grounded state to a closed state by carrying out a reconnecting maneuver and subsequently a closing maneuver.

In order to carry out the above-mentioned maneuvers, the movable contact 10 of each electric pole is suitably driven according to the above-mentioned first rotation direction R1 or second rotation direction R2. In particular, the movable contact 10 moves according to the first rotation direction R1 during an opening maneuver or a disconnecting maneuver of the switching apparatus and it moves according to the second rotation direction R2 during a closing maneuver or a reconnecting maneuver of the switching apparatus.

In general, the movable contact 10 of each electric pole is reversibly movable between a first end-of-run position $P_A$, which corresponds to a closed state of the switching apparatus, and a second end-of-run position $P_C$, which corresponds to a grounded state of the switching apparatus. Conveniently, the movable contact 10 passes through an intermediate position PB, which corresponds to an open state of the switching apparatus, when it moves between the first and second end-of-run positions $P_A$, $P_C$.

As it is reversibly movable about the rotation axis A1, the movable contact 10 can be coupled to or uncoupled from one or more of the fixed contacts 5, 6, 7, 8 thereby electrically connecting or electrically disconnecting these fixed contacts depending on the on-going maneuver.

Conveniently, the movable contact 10 follows an arc-shaped trajectory when it moves between the first and second end-of-run positions $P_A$, $P_C$.

In the switching apparatus of the present disclosure, for each electric pole, the first fixed contact 5 and the second fixed contact 6 have, respectively, a first contact region 5A and a second contact region 6A that are adapted to be coupled to the movable contact 10, when the movable contact 10 is in the first end-of-run position $P_A$ (i.e., the switching apparatus is in a closed state).

Therefore, when it is in the first end-of-run position $P_A$, the movable contact 10 electrically connects the first and second fixed contacts 5, 6 and, consequently, the first and second pole terminals 11, 12.

In the switching apparatus of the present disclosure, for each electric pole, the second fixed contact 6 and the third fixed contact 7 have, respectively, a third contact region 6B and a fourth contact region 7A that are adapted to be coupled to the movable contact 10, when the movable contact 10 is in the second end-of-run position $P_C$ (i.e., the switching apparatus is in a grounded state). Therefore, when it is in the second end-of-run position $P_C$, the movable contact 10 electrically connects the second and third fixed contacts 6, 7 and, consequently, the second and third pole terminals 12, 13.

When it is in the intermediate position PB (open state of the switching apparatus), the movable contact 10 is coupled to no fixed contacts and it is electrically disconnected from said fixed contacts and, consequently, the first, second and third pole terminals 11, 12, 13 are electrically disconnected one from another.

In the switching apparatus of the present disclosure, for each electric pole, the fourth fixed contact 8 is arranged in an intermediate position between the first fixed contact region 5A of the first fixed contact 5 and the third fixed contact region 6B of the second fixed contact 6 while the third fixed contact 7 is arranged in an intermediate position between the first fixed contact region 5A of the first fixed contact and the second fixed contact region 6A of the second fixed contact 6.

Advantageously, the fixed contacts 5, 6, 7, 8 are formed by corresponding pieces of conductive material, which are suitably shaped according to the needs.

In the embodiment shown in the cited figures, the first fixed contact 5 is formed by a reversed-L shaped conductive body having a shorter leg with a first contoured end 5B coupled to the first pole terminal 11 and a longer leg with a second blade-shaped free end forming the first fixed contact region 5A. The second fixed contact 6 is formed by an arc-shaped conductive body extending partially around the rotation axis A1 of the movable contact 10 and having a first contoured end 6C coupled to the second pole terminal 12, a second blade-shaped free end forming the third fixed contact region 6B and an intermediate blade-shaped protrusion forming the second contact region 6A. In operation, also the first contoured end 6C of the fixed contact 6 is couplable with the movable contact 10. The third fixed contact 7 is formed by a blade-shaped conductive body having a contoured end coupled to the third pole terminal 13 and a blade-shaped free end forming the fourth fixed contact region 7A. The fourth contact member 8 is formed by a reversed-T shaped conductive body having a leg coupled to a vacuum interrupter of the switching apparatus and a contoured head slidingly couplable with the movable contact 10.

The movable contact 10 has a first movable contact region 10A and a second movable contact region 10B arranged at opposite sides relative to the rotation axis A1 of the movable contact.

In operation, the first movable contact region 10A can be coupled to or uncoupled from the first contact 5 (at the first fixed contact region 5A), the fourth fixed contact 8 and the second fixed contact 6 (at the third contact region 6B), when the movable contact 10 moves between the first and second end-of-run positions $P_A$, $P_C$. On the other hand, the second contact region 10B can be coupled to or uncoupled from the second fixed contact 6 (at the second contact region 6A and the first contoured end 6C) and the third fixed contact 7 (at the fourth contact region 7A), when the movable contact 10 moves between the first and second end-of-run positions $P_A$, $P_C$.

The first and second movable contact regions 10A, 10B of the movable contact 10 may be aligned one to another along a same direction.

Advantageously, the movable contact 10 is formed by a shaped piece of conductive material.

In the embodiment shown in the cited figures, the movable contact 10 is formed by an elongated conductive body centred on the rotation axis A1 and having a first contoured end forming the first movable contact region 10A and a second contoured end (opposite to the first end 10A) forming the second movable contact region 10B.

The first and second contoured ends 10A, 10B of the movable contact 10 may have a single-blade shape or a double-blade shape.

Conveniently, the switching apparatus 1 includes an actuation assembly (not shown) providing suitable actuation forces to actuate the movable contacts 10 of the electric poles.

Such an actuation assembly may include a motion transmission shaft made of electrically insulating material, which can rotate about the rotation axis A1 and it may be coupled to the movable contacts 10 of the electric poles 2 to provide rotational mechanical forces to actuate the movable contacts 10 during the maneuvers of the switching apparatus.

The above-mentioned actuation assembly may include an actuator coupled to the transmission shaft through a suitable kinematic chain. The actuator may be, for example, a mechanical actuator, an electric motor or an electromagnetic actuator.

In general, the actuation assembly of the switching apparatus may be realized according to solutions of known type. Therefore, in the following, it will be described only in relation to the aspects of interest of the present disclosure, for the sake of brevity.

For each electric pole 2, the switching apparatus 1 includes a vacuum interrupter 20.

The vacuum interrupter 20 includes a fixed arc contact 21 electrically connected to the first pole terminal 11, and the fixed arc contact 21 may be electrically connected in parallel to the first fixed contact 5.

In the embodiment shown in the cited figures, the fixed arc contact 21 is formed by an elongated piece of conductive material having one end coupled to the first pole terminal 11 and an opposite free end intended to be coupled to or decoupled from another arc contact.

The vacuum interrupter 20 includes a movable arc contact 22 reversibly movable along a corresponding translation axis A, which may be parallel or coincident with a main longitudinal axis of the vacuum interrupter.

As it is reversibly movable about the translation axis A, the movable arc contact 22 can be coupled to or uncoupled from the fixed arc contact 21, thereby being electrically connected to or electrically disconnected from this latter.

The movable arc contact 22 is electrically connected to the fourth fixed contact 8, and the movable arc contact 22 may be electrically connected to the fourth fixed contact 8 through a conductor (e.g., a flexible conductor) or other equivalent connection means.

Conveniently, the movable arc contact 22 is solidly coupled to a contact shaft (not shown), which is adapted to transmit motion to the movable arc contact 22 and which may be made, at least partially, of an electrically insulating material. Such a contact shaft is conveniently aligned with the movable arc contact 22 along the translation axis A.

According to possible variants of the present disclosure (not shown), such a contact shaft is coupled to a compression spring coaxially arranged to exert a constant compression force directed to press the movable arc contact 22 towards the fixed arc contact 21, thereby opposing to any movement of the movable arc contact 22 away from the fixed arc contact 21.

In the embodiment shown in the cited figures, the movable arc contact 22 is formed by an elongated piece of conductive material having one end coupled to the above-mentioned contact shaft and an opposite free end intended to be coupled to or decoupled from the fixed contact 21.

The vacuum interrupter 20 includes a vacuum chamber 23, in which a vacuum atmosphere is present. Conveniently, the fixed arc contact 21 and the movable arc contact 22 are enclosed in the vacuum chamber 23 and they can be mutually coupled or decoupled inside said vacuum chamber, therefore being permanently immersed in a vacuum atmosphere.

For each electric pole 2, the switching apparatus 1 includes a motion transmission mechanism 30 operatively coupled to the movable arc contact 22 (the motion transmission mechanism 30 may be operatively coupled to the movable arc contact 22 through the above-mentioned contact shaft) and actuatable by the movable contact 10 to cause a movement of the movable arc contact 22, when such a movable contact moves about its rotation axis A1.

The motion transmission mechanism 30 may be configured to take alternatively a first configuration C1, which corresponds to a closed condition of the vacuum interrupter 20, with the movable arc contact 22 is in a coupled position P3 with the fixed arc contact 21, and a second configuration C2, which corresponds to an open condition of the vacuum interrupter 20, with the movable arc contact 22 is in an uncoupled position P4 from the fixed arc contact 21.

The motion transmission mechanism 30 may be configured to maintain stably the first configuration C1 or the second configuration C2, if it is not actuated by the movable contact 10, and it may be configured to switch its configuration, upon an actuation by the movable contact 10. Any transition of configuration of the motion transmission mechanism 30 causes a corresponding movement of the movable arc contact 22 and a consequent change of condition of the vacuum interrupter 20.

The motion transmission mechanism 30 may be configured to switch from the first configuration C1 to the second configuration C2 upon an actuation by the movable contact 10, while this latter is moving according to the first rotation direction R1 and it electrically connects the fourth fixed contact 8 to the second fixed contact 6. The transition of the motion transmission mechanism 30 from the first configuration C1 to the second configuration C2 causes a corresponding movement of the movable arc contact 22 from the coupled position P3 to the uncoupled position P4.

The motion transmission mechanism 30 may be configured to switch from the second configuration C2 to the first configuration C1 upon an actuation by the movable contact 10, while this latter is moving according to the second rotation direction R2 and it electrically connects the first fixed contact 5 to the second fixed contact 6. The transition of the motion transmission mechanism 30 from the second configuration C2 to the first configuration C1 causes a corresponding movement of the movable arc contact 22 from the uncoupled position P4 to the coupled position P3.

The motion transmission mechanism 30 may include a pair of lever elements of electrically insulating material, which suitably interact so that the motion transmission mechanism 30 operates according to the bistable behavior described above. This solution simplifies the synchronization between the movements of the movable arc contact 22 and the movable contact 10, during an opening or closing maneuver of the switching apparatus.

In principle, however, the motion transmission mechanism 30 may be realized according to other solutions (even of known type), which are here not described in detail for the sake of brevity.

According to the present disclosure, for each electric pole, the first and second pole terminals 11, 12 are arranged at opposite sides of the switching apparatus relative to the rotation axis A1 of the movable contact 10 and are aligned one to another along a first alignment direction D1, which conveniently crosses the rotation axis A1 of the movable contact 10.

According to the present disclosure, for each electric pole, the first and second fixed contact regions 5A, 6A of the first and second fixed contacts 5, 6 are arranged at opposite sides of the switching apparatus relative to the rotation axis A1 of the movable contact 10 and are displaced relative to the first alignment direction D1 of the first and second pole terminals 11, 12. In practice, the first and second fixed contact regions 5A, 6A of the first and second fixed contacts 5, 6 are misaligned with respect to the first and second pole terminals 11, 12 are aligned along a second alignment direction D2 (conveniently crossing the rotation axis A1 of the movable contact 10) that is angularly spaced from the first alignment direction D1 of the first and second pole terminals 11, 12.

For the sake of clarity, it is specified that the term "angularly spaced" referring to the first and second alignment directions D1, D2 means that these alignment directions are not parallel or coincident. In practice, they intersect one to another at the rotation axis A1 of the movable contact 10.

The solution proposed by the present disclosure allows improving the structural compactness of the electric poles of the switching apparatus while ensuring that safe dielectric distances between the live internal components are maintained.

As the first and second fixed contact regions 5A, 6A of the first and second fixed contacts 5, 6 are not aligned with the first and second pole terminals 11, 12 (as it generally occurs in the solutions of the state of the art), a free space in proximity of the first pole terminal 11 can be conveniently exploited for accommodating other components of the electric pole in a portion of internal volume substantially coaxial with the alignment direction D1 of the pole terminals 11, 12. This allows reducing the overall width of the switching apparatus (compared to traditional systems of the state of the art) and at the same time ensuring safe dielectric distances between the internal live components.

In this respect, experimental trials have surprisingly shown that, thanks to this particular layout of the fixed contact regions 5A and 6A of each electric pole, the switching apparatus of the present disclosure can be realized with an overall width that is about 20% lower than the normal width of a corresponding switching apparatus of the state of the art.

According to embodiments of the present disclosure, the vacuum interrupter 20 may be arranged in proximity of the first pole terminal 11 and may be oriented so that the translation axis A of the movable arc contact 22 is parallel to or coinciding with the first alignment direction D1 of the first and second pole terminals 11, 12.

In practice, according to the embodiments of the present disclosure, the vacuum interrupter 20 is oriented vertically (reference is made to a normal operating position of the switching apparatus as shown in the cited figures) and is arranged in proximity of the first pole terminal 11. This allows displacing the whole assembly formed by the vacuum interrupter 20, the fourth fixed contact 8 and the motion transmission mechanism 20 in a portion of internal volume in proximity of the first pole terminal 11, coaxially with the alignment direction D1 of the pole terminals 11, 12.

The overall height of the switching apparatus can thus be reduced (compared to traditional systems of the state of the art) and at the same time ensures safe dielectric distances between the live internal components.

Experimental trials have shown that, thanks to the above-illustrated particular layout of the vacuum interrupter 20, the switching apparatus of the present disclosure can be realized with an overall height that is about 15% lower than the normal height of a corresponding switching apparatus of the state of the art.

In the switching apparatus of the present disclosure, for each electric pole, the first fixed contact 5 and the vacuum interrupter 20 may be at least partially accommodated (together with the first pole terminal 11) in a portion of internal volume defined by the first bushing 43 of the insulating housing 4 of the switching apparatus. In order to favor the accommodation of the vacuum interrupter 20, the first fixed contact 5 may have a shape that is conveniently complementary to the external shape of the vacuum interrupter 20.

This solution further contributes to displace the whole assembly formed by the vacuum interrupter 20, the fourth fixed contact 8 and the motion transmission mechanism 20 towards the top of insulating housing 4 of the switching apparatus (reference is made to a normal operating position of the switching apparatus as shown in the cited figures).

According to another aspect of the present disclosure, for each electric pole, the first and fourth fixed contact regions 5A, 7A and the second and third fixed contact regions 6A, 6B may be arranged on opposite sides of the switching apparatus, relative to the first alignment direction D1 of the first and second pole terminals 11, 12.

Also this solution contributes to improve the overall structural compactness of the electric poles of the switching apparatus.

Conveniently, for each electric pole, the third and fourth fixed contact regions 6B, 7A of the second and third fixed contacts 6, 7 may be arranged at opposite sides of the switching apparatus relative to the rotation axis A1 of the movable contact 10 and are aligned one to another along a third alignment direction D3, which crosses the rotation axis A1 of the movable contact 10.

The third alignment direction D3 of the third and fourth contact regions 6B, 7A is angularly spaced from the first alignment direction D1 of the first and second pole terminals 43, 44 and from the second alignment direction D2 of the first and second fixed contact regions 5A, 6A.

The first, second and third alignment directions D1, D2, D3 are thus not parallel or coincident and intersect one to another at the rotation axis A1 of the movable contact 10.

The operation of the switching apparatus 1 for each electric pole 2 is now described in more detail.

Closed State of the Switching Apparatus

Figure 2:
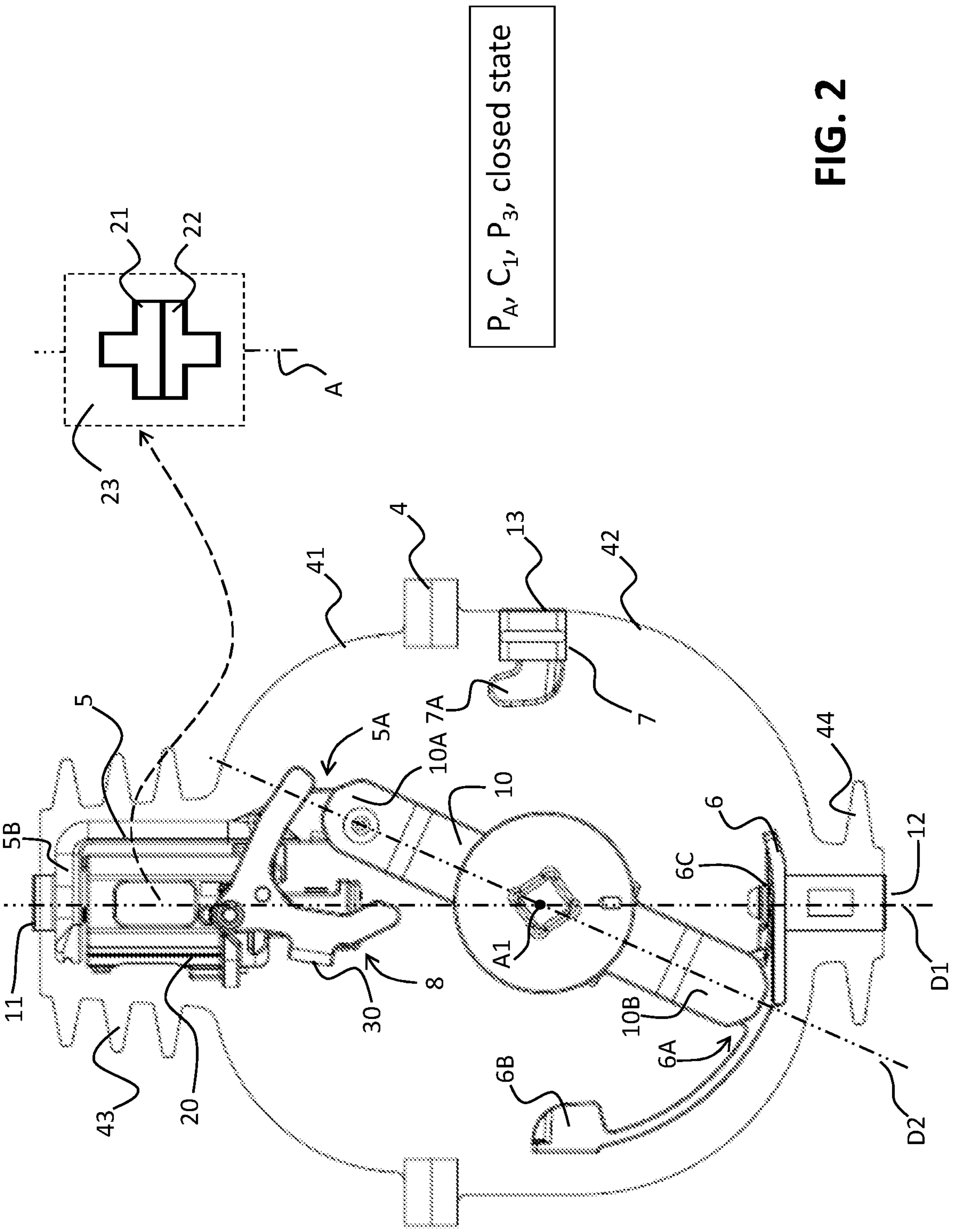
FIGS. 2-8 are schematic views partially showing the internal structure and operation of the switching apparatus of FIG. 1.

When the switching apparatus is in a closed state, each electric pole 2 is in the operating condition illustrated in FIG. 2. In this situation, each electric pole 2 has:

- the movable contact 10 in the first end-of-run position $P_A$;
- the movable contact 10 with the first movable contact region 10A coupled to the first fixed contact region 5A of the first fixed contact 5 and the second movable contact region 10B coupled to the second fixed contact region 6A of the second fixed contact 6;
- the movable arc contact 22 in a coupled position P3 with the fixed arc contact 21;
- the first and second fixed contacts 5, 6 electrically connected one to another and electrically disconnected from the third fixed contact 7;
- the fourth fixed contact 8 electrically disconnected from the second fixed contact 6; and
- the motion transmission mechanism 30 in the first configuration C1.

A current can flow through the electric pole between the first and second pole terminals 11, 12 passing through the first fixed contact 5, the movable contact 10 and the second fixed contact 6. No currents can flow through the vacuum interrupter 20 as the fourth fixed contact 8 is electrically disconnected from the second fixed contact 6.

Open State of the Switching Apparatus

Figure 5:
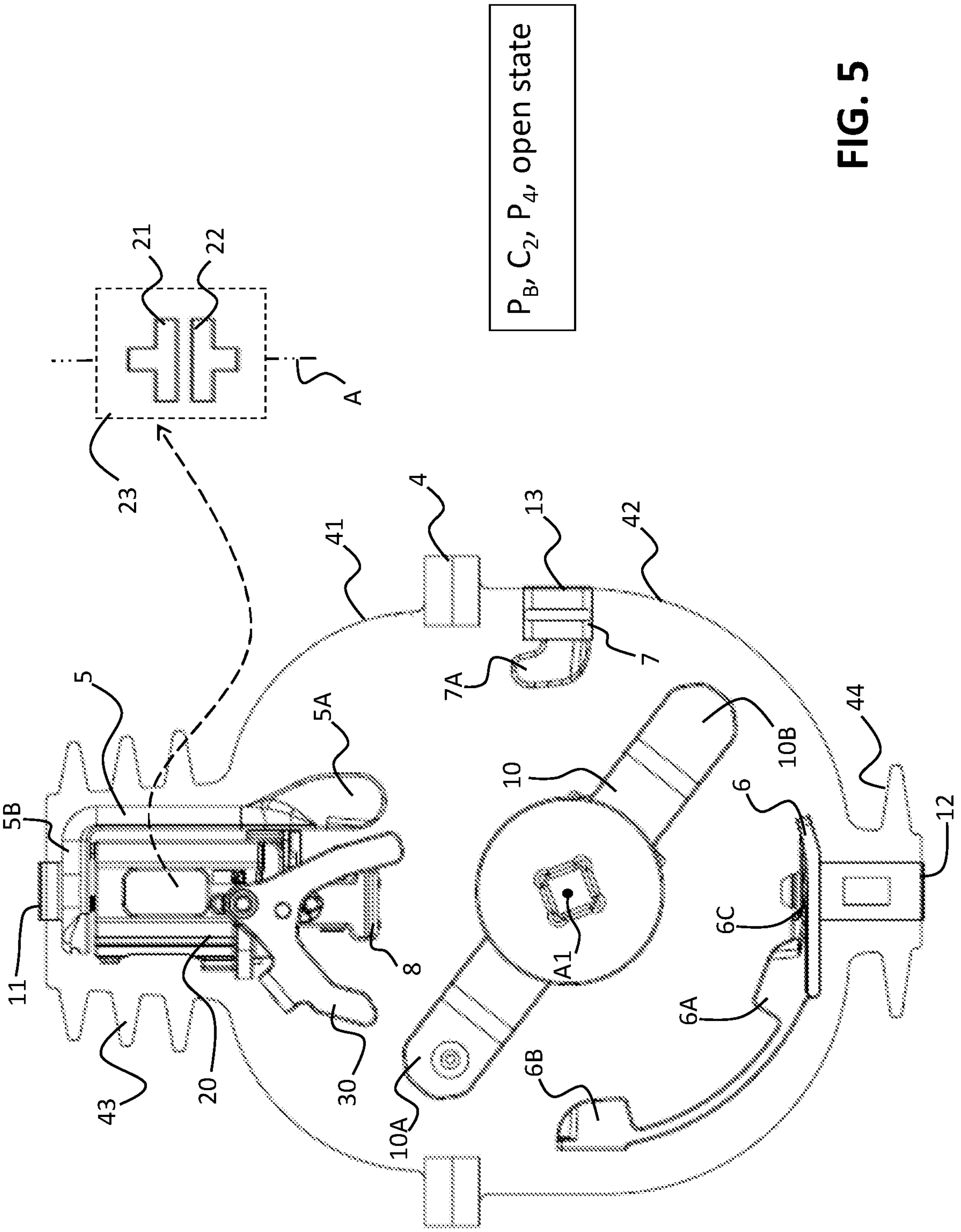

When the switching apparatus is in an open state, each electric pole 2 is in the condition shown in FIG. 5. In this situation, each electric pole 2 has:

- the movable contact 10 in the intermediate position PB and decoupled from any fixed contact;
- the movable arc contact 22 in an uncoupled position P4 from the fixed arc contact 21;
- the first, second and third fixed contacts 5, 6, 7 electrically disconnected one from another;
- the fourth fixed contact 8 electrically disconnected from the second fixed contact 6; and
- the motion transmission mechanism 30 in the second configuration C2.

Any current path between the first and second pole terminals 11, 12 is interrupted at level of the movable contact regions 10A, 10B of the movable contact 10 ("double-disconnection"). No currents can flow between the first and second pole terminals 11, 12.

Grounded State of the Switching Apparatus

Figure 8:
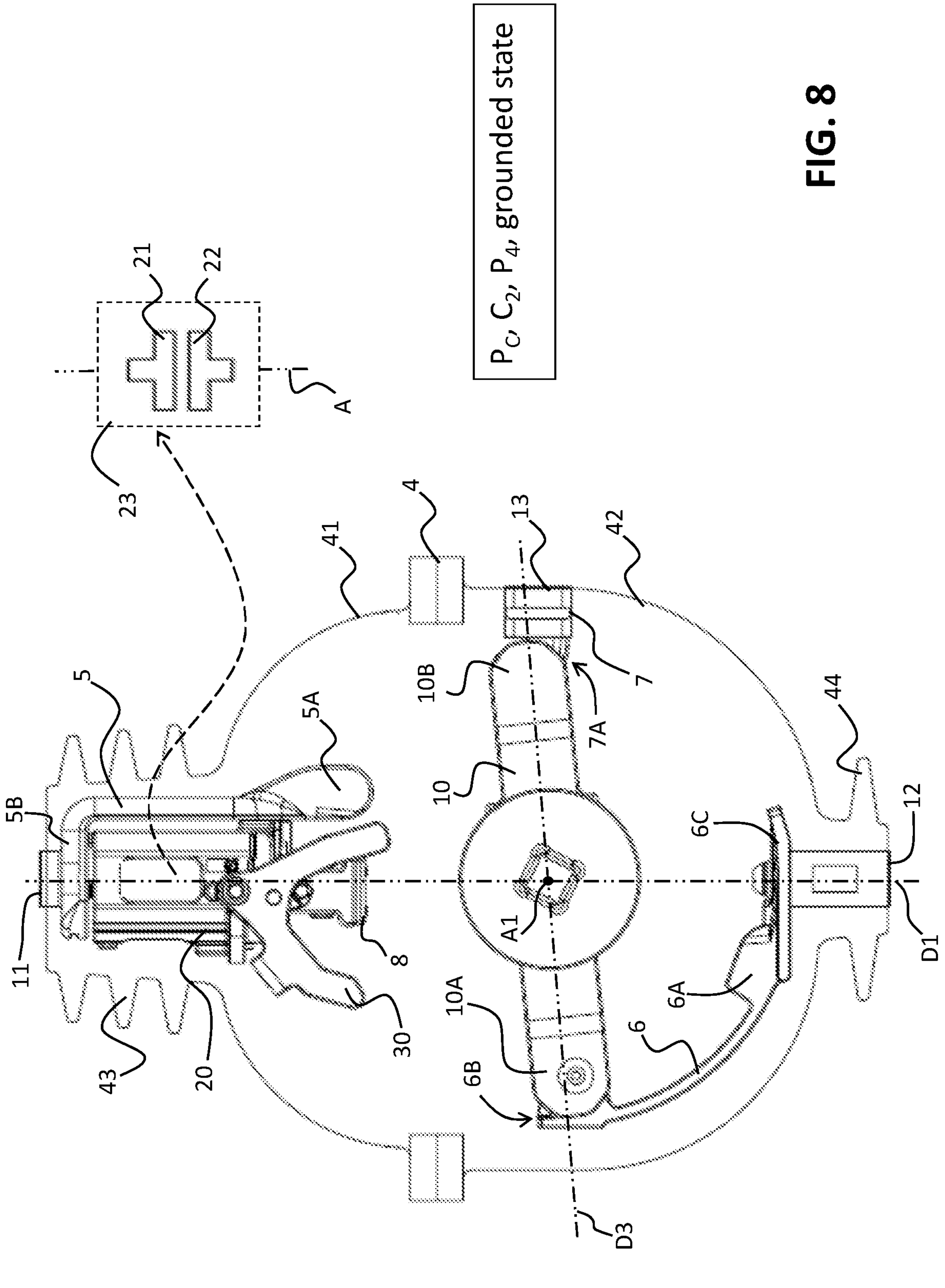

When the switching apparatus is in a grounded state, each electric pole 2 is in the condition illustrated in FIG. 8. In this situation, each electric pole 2 has:

- the movable contact 10 in the second end-of-run position $P_C$;
- the movable contact 10 with the first contact portion 10A coupled to the third fixed contact region 6B of the second fixed contact 6 and with the second contact portion 10B coupled to the fourth contact region 7A of the third fixed contact 7;
- the movable arc contact 22 in an uncoupled position P4 from the fixed arc contact 21;
- the second and third fixed contacts 6, 7 electrically connected one to another and electrically disconnected from the first fixed contact 5;
- the fourth fixed contact 8 electrically disconnected from the second fixed contact 6; and
- the motion transmission mechanism 30 in the second configuration C2.

No currents can flow between the first and second pole terminals 11, 12 and the second pole terminal 12 is put at a ground voltage.

Opening Maneuver

The switching apparatus 1 carries out an opening maneuver, when it switches from the closed state to the open state.

During an opening maneuver of the switching apparatus, the movable contact 10 moves, according to the first rotation direction R1, between the first end-of-run position $P_A$ and the intermediate position PB. The movable contact 10 thus moves away from the corresponding first fixed contact 5.

Figure 3:
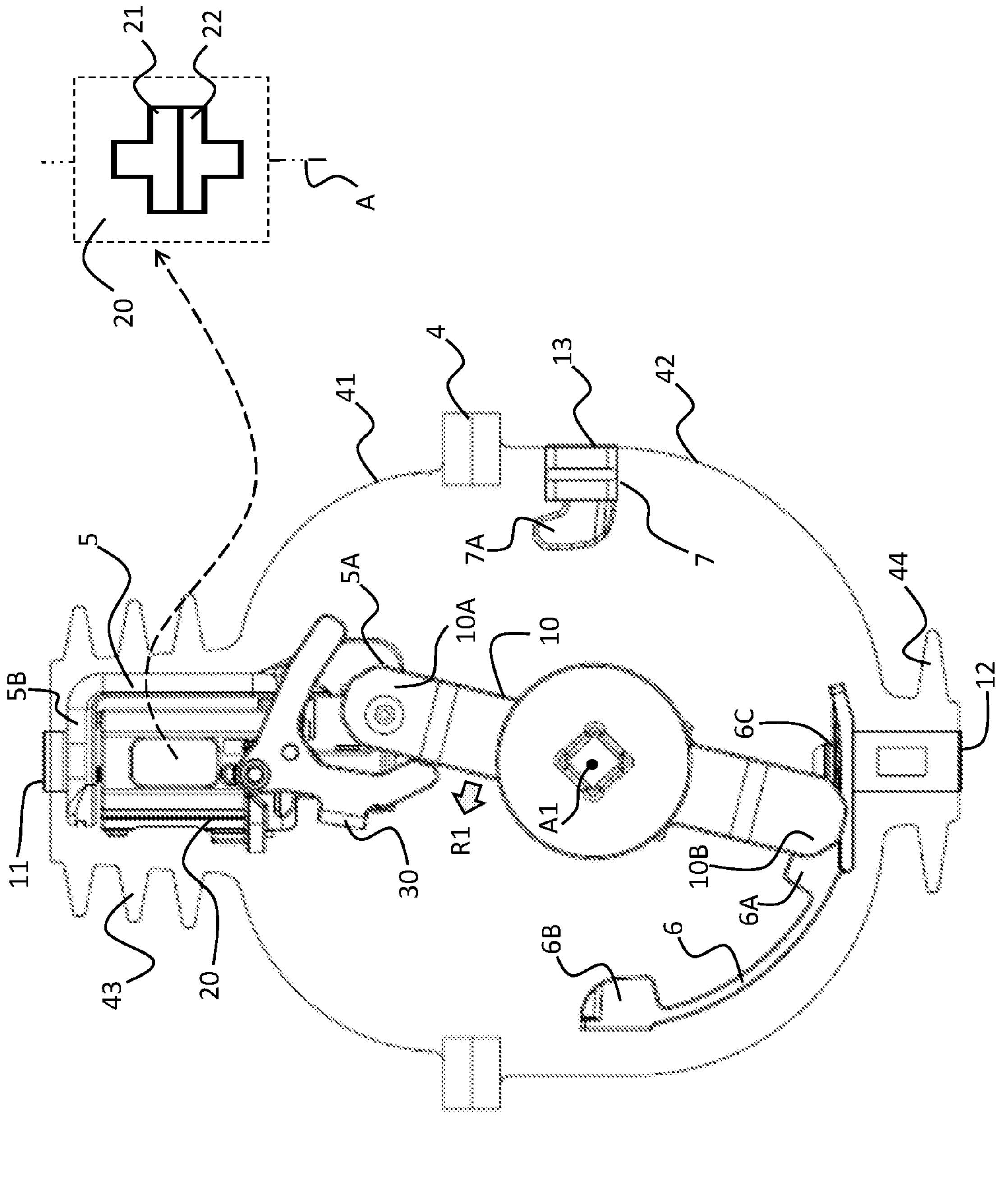

When the movable contact 10 starts moving according to the first rotation direction R1, the first movable contact portion 10A of the movable contact 10 couples to the fourth fixed contact 8 while being slidingly coupled to the first fixed contact region 5A. The second movable contact portion 10A of the movable contact 10 remains slidingly coupled to the second fixed contact 6, at the second contact region 6A and the contoured end 6C (FIG. 3).

The movable contact 10 thus electrically connects both the first fixed contact 5 and the fourth fixed contact 8 with the second fixed contact 6. A current can flow between the first and second pole terminals 11, 12 passing through the first fixed contact 5 and the vacuum interrupter 20 in parallel. Further, most of the current will flow along the first fixed contact 5 as the current path passing through this electric contact has a lower equivalent resistance with respect to the current path passing through the vacuum interrupter.

At this stage of the opening maneuver, the movable contact 10 does not interact with the motion transmission mechanism 30 yet.

Figure 4:
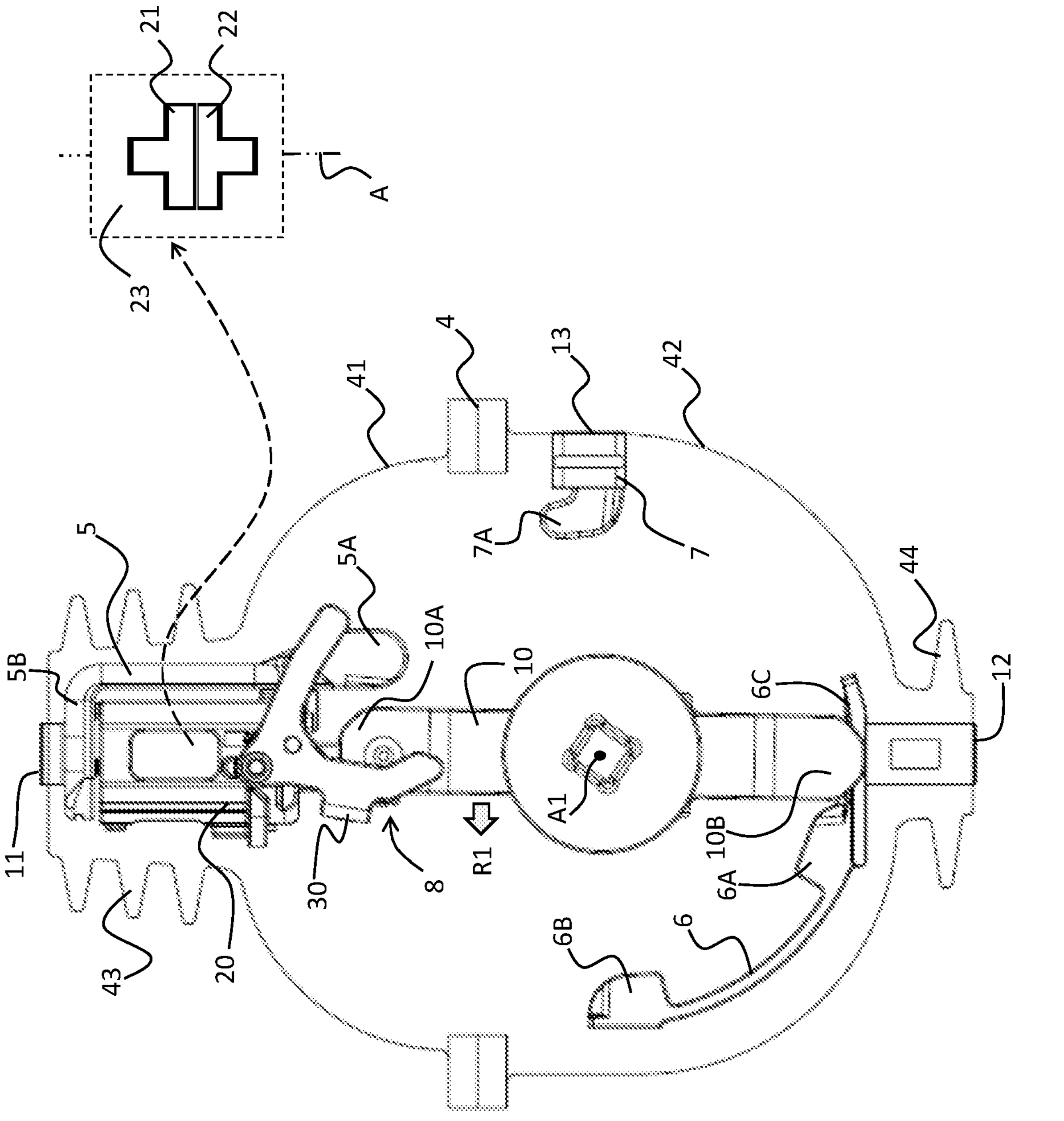

Upon a further movement according to the first rotation direction R1, the movable contact 10 decouples from the first contact region 5A of the first fixed contact 5 while remaining slidingly coupled to the fourth fixed contact 8 and the second fixed contact 6 (FIG. 4).

The movable contact 10 thus electrically disconnects the first fixed contact 5 from the second fixed contact 6 while maintaining the fourth fixed contact 8 electrically connected with the second fixed contact 6. In this situation, a current flowing along the electric pole is fully deviated through the vacuum interrupter 20 as no current can flow through the first fixed contact 5. The formation of electric arcs at the contact region 10A of the movable contact 10 is thus prevented.

At this stage of the opening maneuver, the movable contact 10 does not interact with the motion transmission mechanism 30 yet.

While it is slidingly coupled to the fourth fixed contact 8 and to the second fixed contact 6, the movable contact 10 couples to and actuates the motion transmission mechanism 30, while being slidingly coupled to the fourth fixed contact 8 and the second fixed contact 6 (FIG. 4).

The actuation by the movable contact 10 causes a transition of the motion transmission mechanism from the first configuration C1 to the second configuration C2 and a consequent movement of the movable arc contact 22 from the coupled position P3 with the fixed arc contact 21 to the uncoupled position P4 from the fixed arc contact 21.

The separation of the electric contacts 21, 22 causes the rising of electric arcs between said electric contacts. However, since the electric contacts 21, 22 are immersed in a vacuum atmosphere, such electric arcs can be quenched efficiently thereby quickly leading to the interruption of the current flowing along the electric pole.

In the meantime, the movable contact 10 maintains the fourth fixed contact 8 electrically connected to the second fixed contact 6, thereby preventing the formation of electric arcs at the contact regions 10A, 10B of the movable contact 10.

Upon a further movement towards the intermediate position PB, according to the first rotation direction R1, the movable contact 10 decouples from the motion transmission mechanism 30, which remains in the second configuration C2, and from the second and fourth fixed contacts 6 and 8, thereby electrically disconnecting the fourth fixed contact 8 from the second fixed contact 6.

The movable contact 10 then reaches the intermediate position PB, which corresponds to an open state of the switching apparatus (FIG. 5).

At this stage of the opening maneuver, the movable contact 10 does not interact with the motion transmission mechanism 30 anymore.

Closing Maneuver

The switching apparatus 1 carries out a closing maneuver, when it switches from the open state to the closed state.

Before carrying out a closing maneuver, the switching apparatus may have carried out a reconnecting maneuver in order to switch in an open state.

Figure 6:
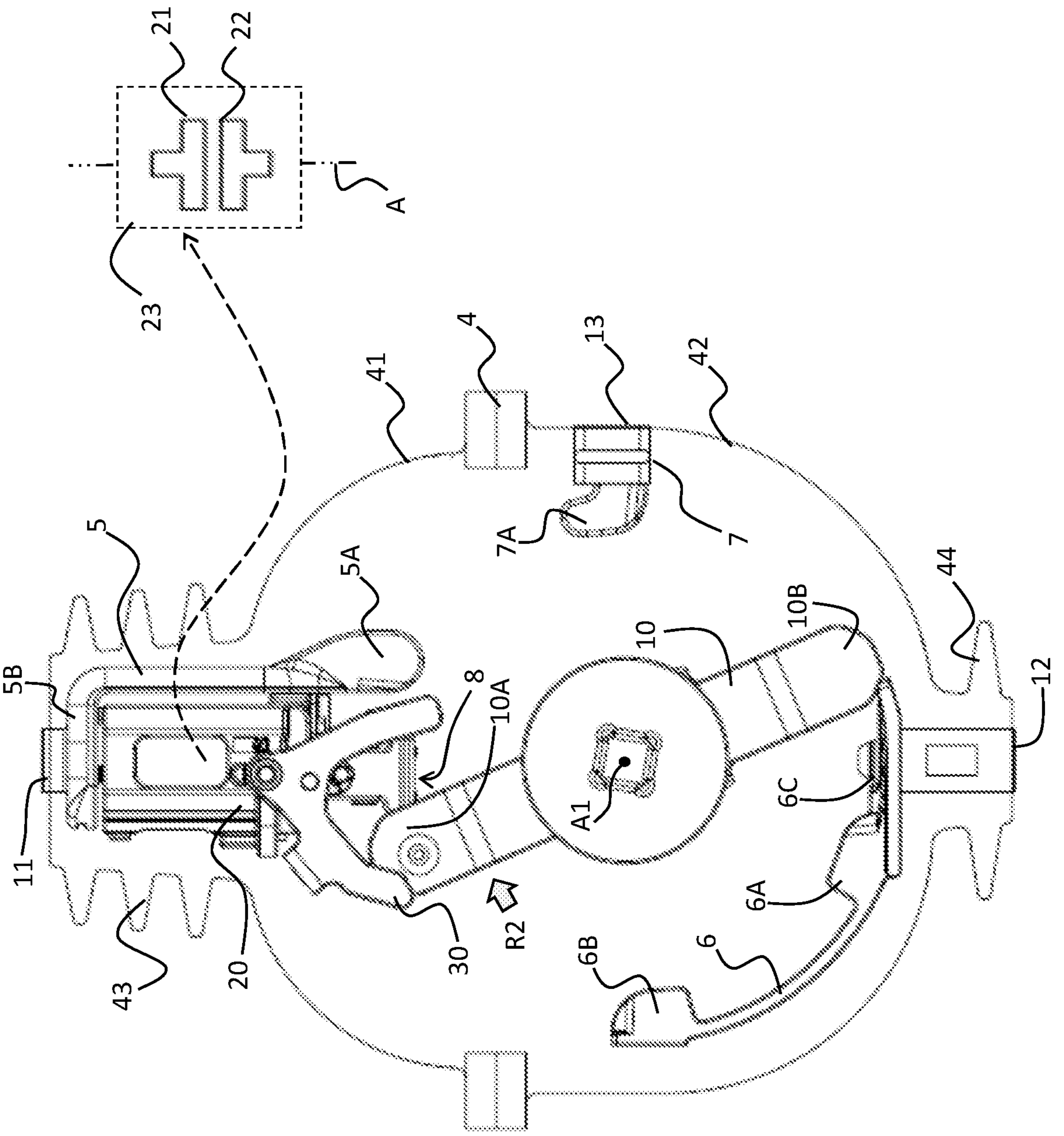

During a closing maneuver of the switching apparatus, the movable contact 10 moves, according to the second rotation direction R2, between the intermediate position PB and the first end-of-run position $P_A$. The movable contact 10 thus moves towards the corresponding first fixed contact 5 (FIG. 6).

Upon an initial movement according to the second rotation direction R2, the movable contact 10 couples to the fourth fixed contact 8 (at the first contact portion 10A) and to the second fixed contact 6 (at the second contact portion 10B), thereby electrically connecting the fourth fixed contact 8 with the second fixed contact 6.

At this stage of the closing maneuver, the movable contact 10 does not interact with the motion transmission mechanism 30 yet.

Figure 7:
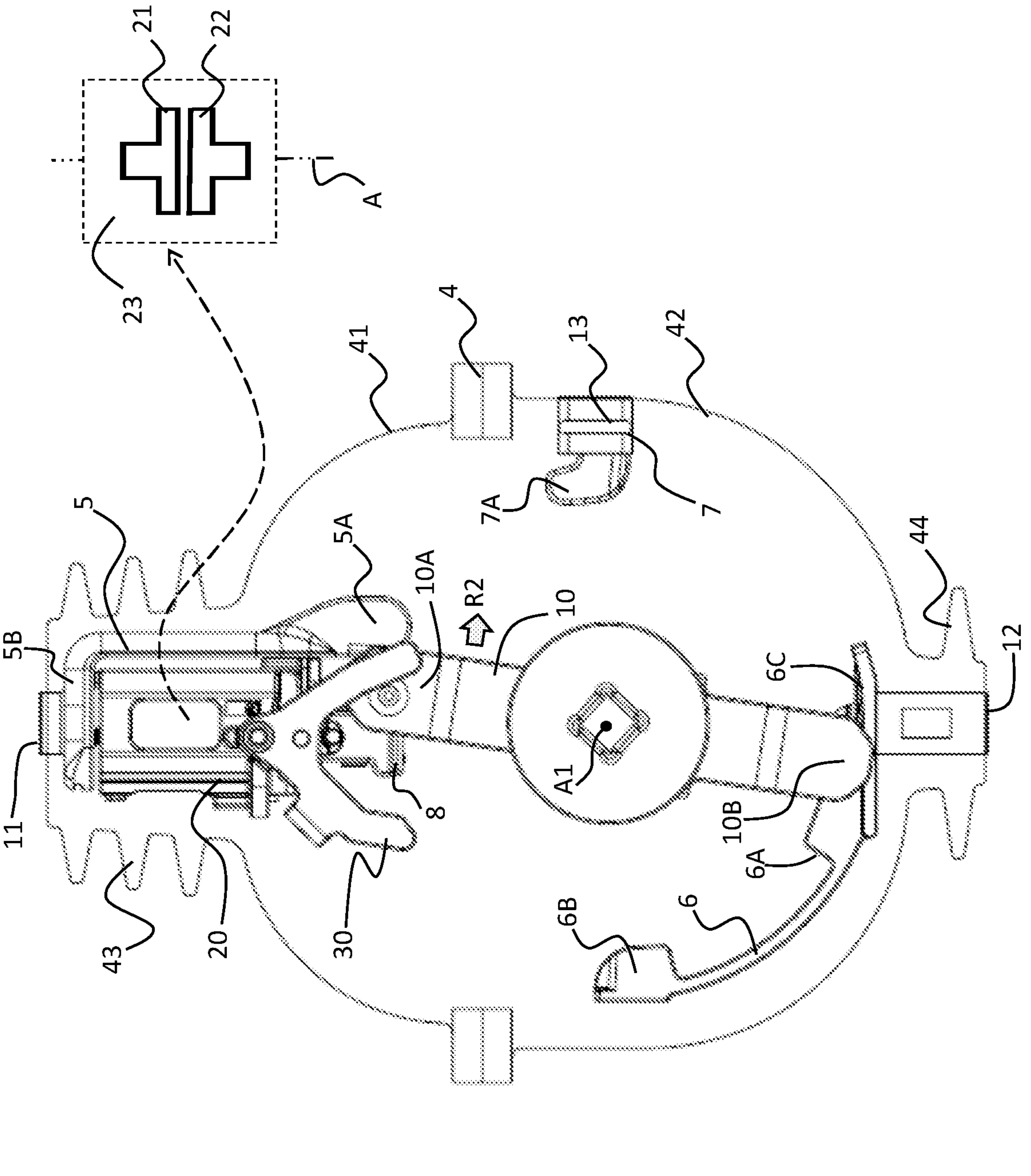

Upon a further movement according to the second rotation direction R2, the movable contact 10 couples to the first fixed contact region 5A of the first fixed contact 5 (at the movable contact portion 10A) while being slidingly coupled to the fourth fixed contact 8 and to the second fixed contact 6 (FIG. 7). In this transitory situation, both the first fixed contact 5 and the fourth fixed contact 8 are electrically connected with the second fixed contact 6.

At this stage of the closing maneuver, the movable contact 10 does not interact with the motion transmission mechanism 30 yet.

Upon a further movement according to the second rotation direction R2, the movable contact 10 decouples from the fourth fixed contact 8 while being slidingly coupled to the first fixed contact region 5A and to the second fixed contact 6 (FIG. 7).

The movable contact 10 thus electrically disconnects the fourth fixed contact 8 from the second fixed contact 6 while maintaining electrically connected the first fixed contact 5 and the second fixed contact 6. In this way, the vacuum interrupter 20 does not have to carry a possible short circuit current or an overload current or, more simply, a nominal current during the "making current" process. The vacuum chamber 23 can be realized with a more compact design, which allows obtaining a size and cost reduction for the overall switching apparatus. While it is slidingly coupled to the first fixed contact region 5A and to the second fixed contact 6, the movable contact 10 couples to and actuates the motion transmission mechanism 30 (FIG. 7).

The actuation by the movable contact 10 causes a transition of the motion transmission mechanism 30 from the second configuration C2 to the first configuration C1 and a consequent movement of the movable arc contact 22 from the uncoupled position P4 from the fixed arc contact 21 to the coupled position P3 with the fixed arc contact 21. In the meantime, the movable contact 10 maintains the first fixed contact 5 electrically connected to the second fixed contact 6.

The movable contact 10 then reaches the first end-of-run position $P_A$, which corresponds to a closed state of the switching apparatus (FIG. 1).

Disconnecting Maneuver

The switching apparatus 1 carries out a disconnecting maneuver, when it switches from an open state to a grounded state.

Further, before carrying out a disconnecting maneuver, the switching apparatus has to carry out an opening maneuver as described above in order to switch in an open state.

During a disconnecting maneuver of the switching apparatus, the movable contact 10 moves, according to the first rotation direction R1, between the intermediate position PB and the second end-of-run position $P_C$.

When the movable contact 10 reaches the second end-of-run position $P_C$, its first movable contact region 10A couples to the third fixed contact region 6B of the second fixed contact 6 while its second movable contact region 10B couples to the fourth fixed contact region 7A of the third fixed contact 7.

In this situation, the movable contact 10 electrically connects the second fixed contact 6 with the third fixed contact 7 and, consequently, the second pole terminal 12 with the ground terminal 13. The second pole terminal 12 results therefore at a ground voltage.

It is evidenced that the motion transmission mechanism 30 remains in the second configuration C2 when the switching apparatus carries out a disconnecting maneuver.

Reconnecting Maneuver

The switching apparatus 1 carries out a reconnecting maneuver, when it switches from a grounded state to an open state.

During a reconnecting maneuver of the switching apparatus, the movable contact 10 moves, according to the second rotation direction R2, between the second end-of-run position $P_C$ and the intermediate position PB.

In this way, the movable contact 10 causes the movable contact 10 to decouple from the second fixed contact region 6B and from the fourth fixed contact region 7A, thereby electrically disconnecting the third fixed contact 7 from the second fixed contact 6.

The movable contact 10 does not electrically connect the second pole terminal 12 with the ground terminal 13 anymore. The second pole terminal 12 therefore results at a floating voltage. It is evidenced that the motion transmission mechanism 30 remains in the second configuration C2, when the switching apparatus carries out a reconnecting maneuver.

The switching apparatus, according to the present disclosure, provides remarkable advantages with respect to the known apparatuses of the state of the art.

In the switching apparatus of the present disclosure, each electric pole has the first and second contact regions 5A, 6A of the fixed contacts 5, 6 that are misaligned with respect to the alignment direction of the first and second pole terminals 11, 12.

The assembly formed by the vacuum interrupter 20, the fourth fixed contact 8 and the motion transmission mechanism 20 can thus be displaced in proximity of the first pole terminal 11, coaxially with the first alignment direction D1 of the first and second pole terminals 11, 12. The switching apparatus, according to the present disclosure, therefore has electric poles with a very compact structure while ensuring safe dielectric distances between the live internal components. In this way, the switching apparatus of the present disclosure can be realized with a remarkably reduced size in comparison to corresponding switching apparatuses of the state of the art.

The switching apparatus, according to the present disclosure ensures high-level performances in terms of dielectric insulation and arc-quenching capabilities during the current breaking process and, at the same time, it is characterized by high levels of reliability for the intended applications.

The switching apparatus, according to the present disclosure is of relatively easy and cheap industrial production and installation in the field.

The invention claimed is:

1. A switching apparatus for medium voltage electric systems, said switching apparatus comprising one or more electric poles, wherein, for each electric pole, said switching apparatus comprises:

a first pole terminal, a second pole terminal, and a ground terminal, said first pole terminal electrically couplable with a first conductor of an electric line, said second pole terminal electrically couplable to a second conductor of said electric line, and said ground terminal electrically couplable to a grounding conductor;

a plurality of fixed contacts spaced apart one from another, said plurality of fixed contacts including a first fixed contact electrically connected to said first pole terminal, a second fixed contact electrically connected to said second pole terminal, a third fixed contact electrically connected to said ground terminal, and fourth fixed contact;

a movable contact reversibly movable about a rotation axis according to a first rotation direction and a second rotation direction, so that said movable contact can be coupled to or uncoupled from said fixed contacts, wherein said movable contact is coupled to a first fixed contact region of said first fixed contact and to a second fixed contact region of said second fixed contact, thereby electrically connecting said first and second fixed contacts, when said switching apparatus is in a closed state, wherein said movable contact is coupled to no fixed contacts, when said movable contact is in an open state, and wherein said movable contact is coupled to a third fixed contact region of said second fixed contact and to a fourth fixed contact region of said third fixed contact, thereby electrically connecting said second and third fixed contacts, when said movable contact is in a grounded state;

a vacuum interrupter comprising a fixed arc contact electrically connected to said first pole terminal, a movable arc contact electrically connected to said fourth fixed contact and reversibly movable along a corresponding translation axis between a coupled position with said fixed arc contact and an uncoupled position from said fixed arc contact, and a vacuum chamber, in which said fixed arc contact and said movable arc contact are enclosed and can be coupled or decoupled; and a motion transmission mechanism operatively coupled to said movable arc contact and actuatable by said movable contact to cause a movement of said movable arc contact along said translation axis, when said movable contact moves about said rotation axis, wherein said first and second pole terminals are arranged at opposite sides of said switching apparatus relative to the rotation axis of said movable contact and aligned one to another along a first alignment direction, wherein, for each electric pole, the first and second fixed contact regions of said first and second fixed contacts are arranged at opposite sides of said switching apparatus relative to the rotation axis of said movable contact, said first and second fixed contact regions displaced relative to the first alignment direction of said first and second pole terminals, so that said first and second fixed contact regions are aligned along a second alignment direction angularly spaced from said first alignment direction, and wherein, during an opening maneuver of said switching apparatus, said movable contact moves according to said first rotation direction towards an intermediate position, wherein, upon an initial movement according to said first rotation direction, said movable contact directly couples to said fourth fixed contact while being coupled to said first fixed contact and to said second fixed contact, thereby electrically connecting said first fixed contact and said fourth fixed contact to said second fixed contact.

2. The switching apparatus according to claim 1, wherein, for each electric pole, said vacuum interrupter is arranged in proximity of said first pole terminal and is oriented so that said translation axis of said movable arc contact is parallel to or coinciding with the first alignment direction of said first and second pole terminals.

3. The switching apparatus according to claim 2, wherein for each electric pole, said first pole terminal, said first fixed contact and said vacuum interrupter are at least partially accommodated in a portion of internal volume defined by a bushing of said switching apparatus.

4. The switching apparatus according to claim 1, wherein said movable contact is reversibly movable between a first end-of-run position, which corresponds to said closed state of said switching apparatus, and a second end-of-run position, which corresponds to said grounded state of said switching apparatus, said movable contact passing through said intermediate position, which corresponds to said open state of said switching apparatus, when moving between said first and second end-of-run positions.

5. The switching apparatus according to claim 4, wherein, during an opening maneuver of said switching apparatus, said movable contact moves according to said first rotation direction away from said first end-of-run position and towards said intermediate position.

6. The switching apparatus according to claim 5, wherein, upon a further movement according to said first rotation direction, said movable contact decouples from said first fixed contact while being coupled to said fourth fixed contact and to said second fixed contact, thereby electrically disconnecting said first fixed contact from said second fixed contact and electrically connecting said fourth fixed contact to said second fixed contact.

7. The switching apparatus according to claim 6, wherein said movable contact couples to and actuates said motion transmission mechanism, while being coupled to said second and fourth fixed contacts, thereby causing a movement of said movable arc contact from said coupled position to said uncoupled position while said movable contact electrically connects said fourth fixed contact to said second fixed contact.

8. The switching apparatus according to claim 7, wherein upon a further movement according to said first rotation direction, said movable contact decouples from said motion transmission mechanism and from said second and fourth fixed contacts and subsequently reaches said intermediate position, thereby electrically disconnecting said fourth fixed contact from said second fixed contact.

9. The switching apparatus according to claim 4, wherein during a closing maneuver of said switching apparatus, said movable contact moves according to said second rotation direction away from said intermediate position and towards said first end-of-run position, and wherein upon an initial movement according to said second rotation direction, said movable contact couples to said fourth fixed contact, thereby electrically connecting said fourth fixed contact to said second fixed contact.

10. The switching apparatus according to claim 9, wherein upon a further movement according to said second rotation direction, said movable contact couples to said first fixed contact while being coupled to said fourth fixed contact and to said second fixed contact, thereby electrically connecting said first fixed contact and said fourth fixed contact to said second fixed contact.

11. The switching apparatus according to claim 10, wherein upon a further movement according to said second rotation direction, said movable contact decouples from said fourth fixed contact while being coupled to said first fixed contact and to said second fixed contact, thereby electrically disconnecting said fourth fixed contact from said second fixed contact and electrically connecting said first fixed contact to said second fixed contact.

12. The switching apparatus according to claim 11, wherein upon a further movement according to said second rotation direction, said movable contact couples to and actuates said motion transmission mechanism while being coupled to said first fixed contact and to said second fixed contact, and wherein an actuation by said movable contact causes a transition of said motion transmission mechanism from a second configuration to a first configuration and a consequent movement of said movable arc contact from said uncoupled position to said coupled position while said movable contact electrically connects said first fixed contact to said second fixed contact.

13. The switching apparatus according to claim 12, wherein upon a further movement according to said second rotation direction, said movable contact decouples from said motion transmission mechanism and subsequently reaches said first end-of-run position, while being slidably coupled to said first fixed contact and electrically connecting said first fixed contact to said second fixed contact.

14. The switching apparatus according to claim 1, wherein the switching apparatus is a load-break switch for medium voltage electric systems.

* * * * *